United States Patent [19]

Tobias et al.

[11] 4,197,353

[45] Apr. 8, 1980

[54] THERMOSETTING POWDER COATING POLYESTERS

[75] Inventors: Michael A. Tobias; George F. Salathe, both of Bridgewater, N.J.

[73] Assignee: Mobil Oil Corporation, New York, N.Y.

[21] Appl. No.: 896,259

[22] Filed: Apr. 14, 1978

[51] Int. Cl.$^2$ .................. B32B 15/08; C08G 63/18; C08G 63/76

[52] U.S. Cl. .................. 428/458; 428/482; 528/305; 528/309; 525/437

[58] Field of Search ............... 528/305, 309; 428/458, 428/482

[56] References Cited

U.S. PATENT DOCUMENTS

| | | | |
|---|---|---|---|
| 3,686,360 | 8/1972 | Cunningham | 260/850 |
| 3,725,340 | 4/1973 | Erdmenger et al. | 528/309 X |
| 3,842,021 | 10/1974 | Grant et al. | 260/15 |

OTHER PUBLICATIONS

Nakamura et al., *Chemical Abstracts,* vol. 85:48,423x (1976).

*Primary Examiner*—Walter C. Danison
*Attorney, Agent, or Firm*—Charles A. Huggett; Ronald J. Cier

[57] ABSTRACT

Thermosettable polyester resin compositions, suitable for use in powder coating applications, derived from a dicarboxylic aromatic acid component (e.g., 1,4-benzenedicarboxylic acid), a trihydroxy alkyl component (e.g., 2-ethyl-2-(hydroxymethyl)-1,3-propanediol), a diol component (e.g., 2,2-dimethyl-1,3-propanediol) and a dihydroxy alkyl compound having 4 to 10 carbon atoms in the primary carbon chain between the hydroxyl moieties (e.g., 1,6-hexanediol). Polyesters of the present invention have a number average MW of from about 2,000 to about 6,000, a combined acid and hydroxyl number of about 35 to about 70 milligrams of KOH per gram of polyester, and a glass transition temperature of about 35° C. to about 50° C.

10 Claims, 1 Drawing Figure

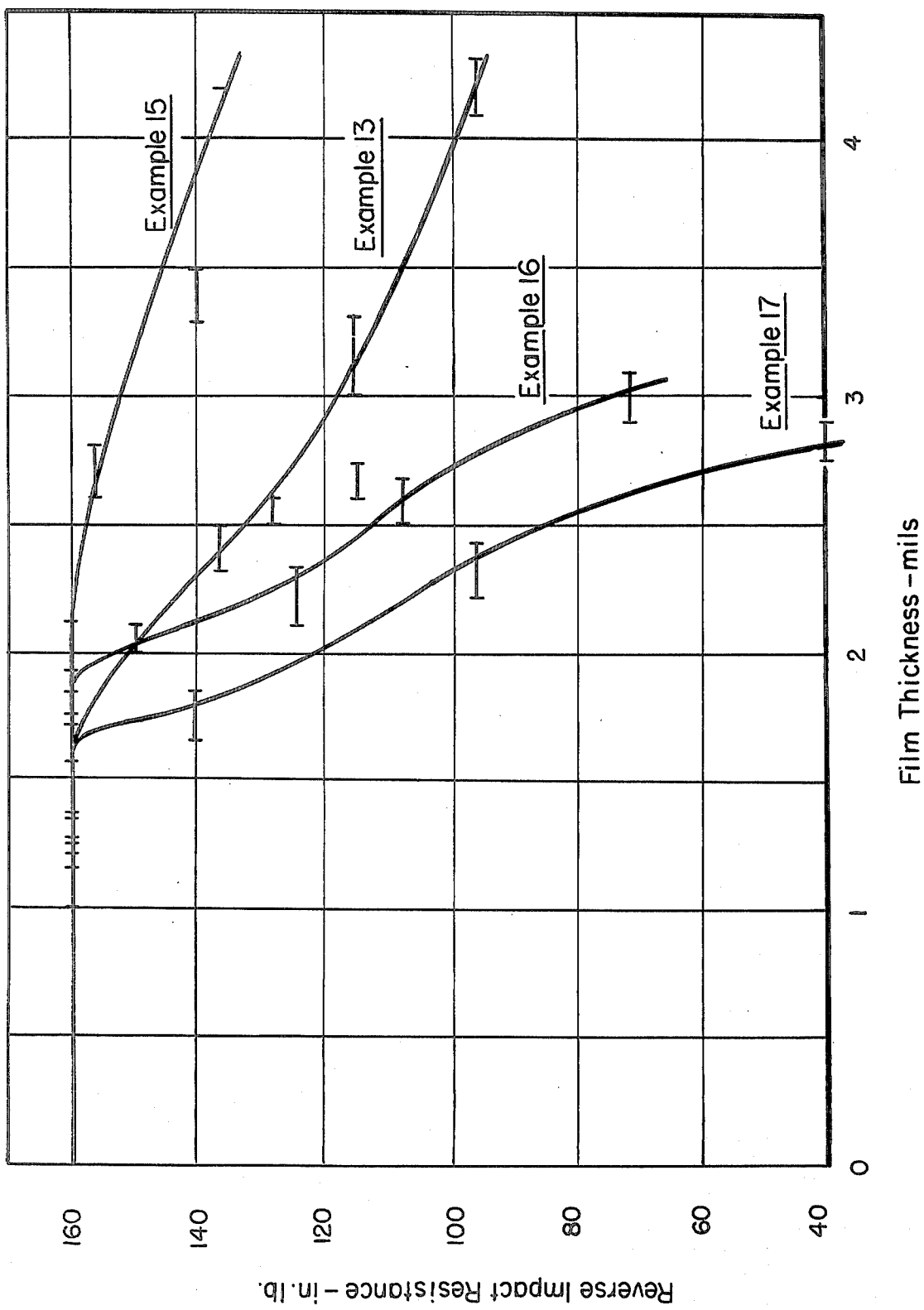

THERMOSETTING POWDER COATING POLYESTERS

BACKGROUND OF THE INVENTION

1. Field of the Invention

The present invention is concerned generally with coating compositions and, more particularly, relates to thermosettable powder coating compositions comprising a polyester resin as a major component thereof.

2. Description of the Prior Art

In U.S. Pat. No. 3,842,021 to Grant et al there are disclosed polyester resin compositions suitable for powder coating. The resin is derived from a dicarboxylic acid component, at least 50 mole percent of which is 1,4-benzenedicarboxylic acid (terephthalic acid), a glycol component, at least 50 mole percent of which is 2,2-dimethyl-1,3-propanediol (neopentyl glycol), and from about 2 to 10 mole percent of a polyol containing 4 to 16 carbon atoms and having at least 3 primary hydroxyl groups. It is taught that, when such resin compositions have a glass transition temperature of at least 60° C., one may use them to formulate a powder coating composition which is non-caking, friable and free-flowing at ambient conditions.

U.S. Pat. No. 4,054,681 to Bruning et al teaches a powder coating composition which is based on a partially crystalline powder of a polyester condensation product of an acid component, at least 60 mole percent of which is 1,4-benzenedicarboxylic acid, and a diol component, at least 50 mole percent of which is 1,4-butanediol, and which has a glass transition temperature of between 20° C. and 50° C. The disclosed compositions are said to readily adhere even to smooth metal surfaces such that they do not become delaminated and are stable in storage.

SUMMARY OF THE INVENTION

Thermosettable powder coating compositions based on a new and unique class of aromatic polyester resins have now been discovered which possess an outstanding combination of physical properties, such as good flow-out capability, good weatherability, hardness and flexibility, resistance to heat, scuffing, moisture and solvents, and excellent impact strength.

The resin compositions of the present invention are substantially crystalline powders which are the polyester condensation products of a reaction mixture comprising about 55 to about 65 percent by weight of a dicarboxylic aromatic acid component, about 2 to about 7 percent by weight of a trihydroxy alkyl component, about 20 to about 35 percent by weight of a diol component which comprises 2,2-dimethyl-1,3-propanediol taken alone or in admixture with a minor amount of one or more other diol compounds of lower molecular weight, and 1 to 15 percent by weight of a dihydroxy alkyl compound having 4 to 10 carbon atoms in the primary carbon chain between the hydroxyl moieties. Such components are desirably in a combination such that the resulting polyester has a number average molecular weight of from about 2,000 to about 6,000, a combined acid and hydroxyl number of about 35 to about 70 milligrams of KOH per gram of polyester, and a glass transition temperature of about 35° C. to about 50° C.

BRIEF DESCRIPTION OF THE DRAWING

The single drawing FIGURE appended hereto is a graphical illustration of the Reverse Impact Resistance vs. Film Thickness response of two typical film coatings of our invention (Examples 13 and 15) compared to two coatings (Examples 16 and 17) not based on the unique resins of our invention.

DESCRIPTION OF THE PREFERRED EMBODIMENTS

Suitable comounds for the aromatic acid component of the polyester resin compositions of the present invention are crystalline difunctional aromatic acids. The most preferable compound is 1,4-benzenedicarboxylic acid (terephthalic acid) since it possesses a molecular plane of symmetry which enchances the crystallinity of the polyester resins built upon it and increases the tendencies of the product to form a good workable powder. Other polycarboxylic aromatic acids, especially those having similar molecular planes of symmetry, are equally useful building blocks in this regard and non-symmetrical isomers of such symmetrical compounds are also useful when combined in minor amount with their symmetrical counterparts. For example, one may mix as much as 20 percent by weight of 1,3-benzenedicarboxylic acid or 1,2-benzenedicarboxylic acid (or its anhydride) with the symmetrical 1,4-benzenedicarboxylic acid without substantially effecting the crystallinity and other desirable properties of the polyester resin product of this invention. The aromatic acid component is used in an amount between about 55 and 65 weight percent, based upon the total weight of the reactants.

The trihydroxy alkyl component of the polyester resin can be a linear or branched hydrocarbon compound and the three hydroxyl functions may be attached to either terminal or to non-terminal carbon atoms in the molecule. It has been found that triol compounds having an internal tertiary carbon atom in the hydrocarbon skeleton, such that each of the hydroxyl groups is on a different terminal carbon atoms, result in the most stable configuration for the polyester product. For this reason the preferred trihydroxy compounds are those exemplified by 2-ethyl-2(hydroxymethyl)-1,3-propanediol (trimethylolpropane; TMP) and 2-(hydroxymethyl)-2-methyl-1,3-propanediol (trimethylolethane; TME; pentaglycerol). Such compounds are used in an amount between about 2 weight percent and about 7 weight percent, based upon the total weight of the reactants.

The third component of the polyester resins of this invention is an alkyl diol compound, preferably 2,2-dimethyl-1,3-proanediol (neopentyl glycol). Other similar diol compounds, such as 1,2-ethanediol, 1,2-propanediol and 1,3-butanediol, have been used in the art to prepare thermosettable polyester resins and are likewise suitable here, preferably in admixture with the 2,2-dimethyl-1,3-propanediol. Such diol component constitutes between about 20 weight percent and about 35 weight percent of the composition, based upon the total weight of the reactants.

The remaining diol component of the polyester resins of our invention is a dihydroxy alkyl compound having 4 to 10 carbon atoms in the primary carbon chain between the hydroxyl moieties. The most preferred compound is 1,6-hexanediol (hexamethylene glycol), but other similar compounds having two hydroxyl groups separated by 4 to 10 carbon atoms may be successfully substituted therefore. Such dihydroxy component is used in an amount between about 1 weight percent and about 15 weight percent, based upon the total weight of the reactants.

The esterification reaction is carried out at temperatures between about 200° C. and about 250° C., for a period of time ranging between about 5 and about 10 hours. A conventional catalyst for the promotion of esterification reactions, such as dibutyltin oxide, can be used in catalytic amounts (e.g., 0.01–1.0 weight percent) to aid in the present reaction. During the reaction it is advantageous to remove the water evolved from the esterification, for instance by means of a suitable trap which condenses and draws off the water vapor, or by flushing the reactor with an inert gas to sweep the vapor away from the reactants. The resulting polyester has a number average molecular weight of from about 2,000 to about 6,000, a combined acid and hydroxyl number of about 35 to about 70 milligrams of KOH per gram of polyester, and a glass transition temperature of about 35° C. to about 50° C.

The invention also encompasses thermosetting powder coating compositions based on the above-described polyester resin together with a curing agent, a flow control agent and a catalyst. Conventional pigmenting materials may also be included in the formulation to impart a desirable color to the coated substrate. The curing agents contemplated for the coating formulations comprise conventional cross linking compounds for setting up of chemical links or bonds between the molecular chains of polymers. Such materials include, but are not limited to: caprolactam blocked isophorone diisocyanate; caprolactam blocked toluene diisocyanate; methyl ethyl ketoxime blocked isophorone diisocyanate; partially or completely alkylated melamines and partially or completely alkylated glycolurils. Other curing agents known in the art to be useful in powder coating application of thermosettable resins are likewise useful in formulations of the present invention, as would generally be known by those skilled in the art. The amount of cross-linking agent used is between about 5 weight percent and about 25 weight percent of the resin solids in the formulation.

Similarly, catalysts useful for promoting the cross-linking reaction are any of those commonly known in the art as being useful in thermosetting of polyester resin coatings. Examples include, but are not limited to: stannous octoate; dibutyltin dilaurate and p-toluene sulphonic acid. Such catalysts are normally used in amounts corresponding to about 0.05 weight percent to about 0.4 weight percent of the resin solids.

A flow control agent is desirably incorporated into the coating compositions to aid in leveling the applied and thermoset coating, i.e., to help make the coating as smooth as or smoother than the surface of the uncoated substrate to which it is applied. Numerous flow control agents are known in the art and usable in the present compositions. An example of a commercially obtainable agent is the substance available under the trade name "Modaflo." Coating compositions of the present invention would normally include about 0.5 weight percent to about 1.5 weight percent of such leveling agent based on the weight of resin solids.

The powder coatings can be applied to the substrates by any desired powder coatings process, although fluidized bed sintering (FBS), electrostatic powder coating (EPC) and the electrostatic fluidized bed (EFB) processes are preferred. The coating powders of the invention are especially well suited for the production of homogenous, firmly adherent coatings on substrates through coating by the fluidized bed or electrostatic spray methods.

In fluidized bed sintering (FBS) a preheated metal part is immersed into the coating powder of the invention, which is kept suspended by a gentle flow of air. The grain size of the powder generally ranges between 100 and 200 microns. The powder is suspended by blowing air through a porous bottom of a container so that it assumes a fluidized state. The pieces to be coated are preheated to 250° to 400° C. and dipped into this fluidized bed. The immersion time of the material being coated depends on the thickness of the coating that is to be produced and amounts to from 1 to 12 seconds. In general, the finished coating is prepared in a single procedure in about 3 to 7 seconds.

In the electrostatic powder coating (EPC) process, the coating powder of the invention, which normally has a grain size of under 125 microns, is blown by compressed air into the applicator where it is charged with a voltage of 30 to 100 kV by a high-voltage direct current, and sprayed onto the surface of the material to be coated. Then it is baked on at a specific temperature for specific lengths of time in suitable ovens. The powder adheres to the cold work piece due to its charge because it loses its charge slowly on account of its high electrical resistance of approximately $10^{13}$ to $10^{17}$ ohms centimeter.

In the electrostatic fluidized bed (EFB) process, the two procedures are combined by mounting annular or partially annular electrodes over a fluidized bed containing the powder so as to produce the electrostatic charge of, for example, 50 to 100 kV. Plates heated above the sintering temperature of the powder, at for example 250° to 400° C., are briefly dipped into the powder cloud without post-sintering, or cold or preheated plates are provided with a powder coating by electrostatic methods and the coating is fused by post-sintering at temperatures specific for the plastic powder.

Numerous substances can be coated by these powder coating methods with powders of the invention, within the limits allowed by the fusing process or the heating time, as the case may be. The preferred substrates are metals, but other materials such as glasses or ceramic articles or other heat resistant materials can be coated.

It is frequently preferred to incorporate one or more pigmentary materials into the coating formulations of this invention. One such preferred pigment is titanium dioxide, but any of the well known conventional pigmenting materials can be used, such as: phthalocyanine blues and greens; red, yellow, black and brown iron oxides; chrome oxide green; natural or synthetic silicas, silicates, carbonates and so forth. Sufficient pigmentation is used to provide an opaque or colored film as needed for the desired appearance.

In order to more fully illustrate the nature of the invention and the manner of practicing the same, the following examples are presented. Measurements made on the applied coatings were obtained in accord with ASTM standard test methods as follows:

| | | |
|---|---|---|
| Reverse Impact | ASTM | D-2794-69 |
| Gloss | ASTM | D-523-67 |
| Conical Mandrel | ASTM | D-522-60 |

| | | |
|---|---|---|
| Bend Elongation Cross-Hatch Tape Adhesion | ASTM | D-3359-76 |
| Tukon Hardness | ASTM | D-1474-68 |

The glass transition temperatures of the polyester resins were determined via differential scanning caloimeter (DSC), while molecular weight determinations were by means of gel permeation chromatography using a polystyrene calibration standard.

EXAMPLE 1

A five liter round bottom flash, fitted with a steam jacketed distillation column, was charged with 931.0 g of 2,2-dimethyl-1,3-propanediol, 176.0 g of 2-ethyl-2-(hydroxymethyl)-1,3-propanediol and 352.0 g of 1,6-hexanediol and heated until a homogenous melt was obtained. The flask was then charged with 1037.5 g of 1,4-benzenedicarboxylic acid and 1.7 g of dibutyltin oxide and heated gradually to 205° C. and maintained there until 185 ml of distillate (H$_2$O) had been collected. An additional 1037.5 g of 1,4-benzenedicarboxylic acid was added and the reaction temperature gradually raised to 250° C. and maintained there until an acid number of 9.2 was obtained. The reaction product was then poured into a Teflon coated tray and allowed to cool to ambient temperature. The resulting polyester had an acid number of 7.9, a hydroxyl number of 45.6, a glass transition temperature of 45° C., a number average molecular weight of 3784 and a weight average molecular weight of 23,340.

EXAMPLES 2–9

TABLE I, following, contains examples of polyesters which were prepared by the same technique as that shown in Example 1.

EXAMPLE 12

Employing the polyester of Example 1, a high gloss, white powder coating was prepared as follows:

| | |
|---|---|
| Polyester resin from Example 1 | 460 grams |
| Caprolactam blocked isophorone diisocyanate | 88 grams |
| Stannous Octoate | 2 grams |
| Modaflo (leveling agent) | 5 grams |
| Rutile Titanium Dioxide | 448 grams |

All of the above ingredients initially were combined in a high speed mill such as the Welex mill, where the solid components were rapidly fragmented into small particles. The resulting intimate mixture was then continuously processed through a twin screw extruder at approximately 121° C. (250° F.), which produces a homogenous viscous melt while achieving good wetting and uniform dispersion of the pigment. The resulting melt was discharged onto a pair of water cooled squeeze rools, from which the emerging cooled sheet was subsequently chipped or roughly crushed prior to pulverizing in a Condux or Mikro-pul mill to particle sizes of 100 microns or less.

The powder so obtained was then electrostatically spray applied under a negative potential of 50–80 kV to suitably grounded steel panels so as to produce uniform films of 1.25–1.50 mils thickness, after baking for 10 to 30 minutes at temperatures of 177°–204° C. (350°–400° F.).

It has been found that such coatings combine excellent film hardness and reverse impact flexibility with resistance to conical mandrel bends, have high glosses, good flow and withstand cross-hatch tape adhesion tests. A typical coating, baked 15 minutes at 204° C. (400° F.) showed no cracking at 160 in. lb. reverse im-

TABLE 1

| | Polyester composition, Wt. % | | | |
|---|---|---|---|---|
| EXAMPLE | 2,2-Dimethyl-1,3-propanediol | 1,6-Hexanediol | 2-Ethyl-2(hydroxymethyl)-1,3-propanediol | 1,4-Benzendicarboxylic Acid |
| 1 | 26.34 | 9.96 | 4.98 | 58.72 |
| 2 | 33.65 | 4.98 | 2.00 | 59.37 |
| 3 | 30.91 | 5.01 | 5.01 | 59.07 |
| 4 | 28.71 | 10.00 | 2.00 | 59.29 |
| 5 | 27.52 | 9.98 | 3.50 | 59.00 |
| 6 | 26.34 | 9.96 | 4.98 | 58.72 |
| 7 | 25.82 | 10.03 | 5.02 | 59.13 |
| 8 | 24.98 | 9.81 | 7.01 | 58.19 |
| 9 | 21.51 | 15.00 | 5.00* | 58.49 |
| 10** | 35.66 | -0- | 5.00 | 59.34 |
| 11** | 36.53 | -0- | 4.01 | 59.46 |

| | Properties | | | |
|---|---|---|---|---|
| EXAMPLE | Acid No. | Hydroxyl No. | Glass Transition Temperature | MW (# Avg.) | MW (Wgt. Avg.) |
| 1 | 7.9 | 45.6 | 45° C. | 3784 | 23,340 |
| 2 | 9.4 | 32.3 | 49° C. | 3445 | 12,450 |
| 3 | 9.2 | 47.1 | 50° C. | 3488 | 25,130 |
| 4 | 10.9 | 38.9 | 41° C. | 3387 | 12,860 |
| 5 | 8.6 | 41.3 | 42° C. | 3395 | 16,830 |
| 6 | 9.0 | 49.1 | 45° C. | 3659 | 21,720 |
| 7 | 8.9 | 42.2 | 45° C. | 3496 | 23,419 |
| 8 | 8.1 | 65.1 | 43° C. | 3314 | 21,880 |
| 9 | 8.5 | 48.4 | 37° C. | 3561 | 22,918 |
| 10** | 8.5 | 47.9 | 62° C. | 3955 | 15,557 |
| 11** | 8.5 | 49.4 | 58° C. | 3741 | 11,495 |

*2-(hydroxymethyl)-2-methyl-1,3-propanediol
**Examples for comparison pact, did not fail in conical mandred bends, and had a 60° gloss of 90 and a 20° gloss of 70, the latter indicating good flow and leveling.

The following are typical examples of white, high gloss powder coatings prepared with certain of the polyesters cited previously.

EXAMPLE 13

| Titanium Dioxide | 603 grams |
|---|---|
| Caprolactam blocked isophorone diisocyanate | 86 grams |
| Polyester resin from Example 6 | 407 grams |
| Modaflo (leveling agent) | 5.0 grams |
| Stannous octoate | 1.8 grams |

The above composition, mixed, extruded, pulverized and screened as described in Example 12, was electrostatically spray applied to 24 gauge steel panels treated with Bonderite 1000 phosphate surface treatment so as to produce films which, when properly baked, ranged in thickness from 1.25 to 1.50 mils in thickness. When baked at as low as 160° C. (320° F.) for 30 minutes or 171° C. (340° F.) for 10 minutes, or as high as 221° C. (430° F.) for 20 or 30 minutes, they displayed no failure under reverse impact testing at 160 inch-pounds of load and their 60° glosses ranged from 86 to 92. These baked powder coatings exhibited 30% or greater elongation via the conical mandred bend test and no failure in the cross-hatch tape adhesion test. Film hardness measured with the Tukon Hardness Tester ranged from 16.3 to 16.6 KHN.

EXAMPLE 14

| Titanium dioxide | 336 grams |
|---|---|
| Caprolactam blocked isophorone diisocyanate | 53 grams |
| Polyester resin from Example 4 | 357 grams |
| Modaflo (leveling agent) | 4.4 grams |
| Stannous octoate | 1.6 grams |

The above composition, processed and applied to Bonderite 1000 treated panels as described in Example 12 to produce films of similar thickness, again exhibited excellent reverse impact flexibility in films baked at as low as 171° C. (340° F.) for 20 minutes or 188° C. (370° F.) for 5 minutes to as high as 221° C. (430° F.) for 20 and 30 minutes, withstanding 160 inch-pounds of reverse impact without sign of cracking or other failure. The 60° glosses ranged from 89 to 91, the conical mandrel bend elongations were 30% or greater, they disclosed no failure in the cross-hatch adhesion test, and their film hardnesses ranged from 16.2 to 16.6 KHN.

EXAMPLE 15

| Titanium Dioxide | 336 grams |
|---|---|
| Caprolactam blocked isophorone diisocyanate | 62 grams |
| Polyester Resin from Example 5 | 348 grams |
| Modaflo (leveling agent) | 4 grams |
| Stannous octoate | 1.5 grams |

The above composition was processed and electrostatically spray applied to Bonderite 1000 treated panels in the manner previously described, all panels being baked for 15 minutes at 204° C. (400° F.). The powder deposition rates were controlled so as to produce panels of differing film thickness as described below, which when subjected to the tests defined earlier exhibited the following reverse impact resistances and 60° gloss values depending upon coating thickness:

| Coating Thickness | Resists Impact with no failure | 60° Gloss |
|---|---|---|
| 1.75 mils | 160 in. lb. | 87 |
| 2.0–2.1 mils | 160 in. lb. | 87 |
| 2.6–2.8 mils | 156 in. lb. | 87 |
| 3.3–3.5 mils | 140 in. lb. | 86 |
| 4.2 mils | 136 in. lb. | 84 |

The Tukon hardnesses for this coating composition, measured on films of 1.25 to 1.50 mils thickness and baked at 171° C. (340° F.) and 204° C. (400° F.) for varying time intervals, ranged from 16.2 to 16.8 KHN.

The following examples were prepared for purposes of comparison. The resins used (Examples 10 and 11 above) and the coating formulations are typical of the prior art. The primary difference between these comparative examples and the present invention is that the comparative polyesters lack the 1,6-hexanediol component of the previous examples. As a result, and as the test data following Examples 16 and 17 clearly demonstrates, the coating devoid of such diol component are significantly less flexible than those of the present invention.

EXAMPLE 16 (for comparison)

| Titanium dioxide | 336 grams |
|---|---|
| Caprolactam blocked isophorone diisocyanate | 82 grams |
| Polyester resin from Example 10 | 328 grams |
| Modaflo (leveling agent) | 4.1 grams |
| Stannous octoate | 1.5 grams |

The above composition was processed and applied to Bonderite 1000 treated panels as described in Example 12.

EXAMPLE 17 (for comparison)

| Titanium dioxide | 336 grams |
|---|---|
| Caprolactam blocked isophorone diisocyanate | 82 grams |
| Polyester resin from Example 11 | 328 grams |
| Modaflo (leveling agent) | 4.1 grams |
| Stannous octoate | 1.5 grams |

The above composition was processed and applied to Bonderite 1000 treated panels as described in Example 12.

TABLE II shows the variations in reverse impact flexibility of four film coating compositions at various film thicknesses. Examples 13 and 15 are typical of the film coatings of the present invention and are based on polyester resins containing the diol flexibility improver (the polyester resins of Examples 5 and 6, respectively). Examples 16 and 17 are similar formulations, except that they do not contain the diol flexibility improver (they are based on the polyester resins of Examples 10 and 11, respectively). Since it is not possible to obtain exactly matching thicknesses for multiple coatings, regardless of the thickness level striven for, it is customary in the art to plot this type of data in graphical form and use th plot to interpolate impact data at any given film thickness. Such a plot of the data from TABLE II is presented in the FIGURE appended hereto.

TABLE II

Variations in Reverse Impact Resistance with Changing Film Thickness

| EXAMPLE 13 | | EXAMPLE 15 | |
|---|---|---|---|
| Film Thickness | Reverse Impact | Film Thickness | Reverse Impact |
| 1.20–1.24 mils | 160 in.lb. | 1.22–1.36 mils | 160 in.lb. |
| 1.60–1.70 mils | 160 in.lb. | 1.75 mils | 160 in.lb. |
| 2.00–2.10 mils | 148 in.lb. | 2.0–2.1 mils | 160 in.lb. |
| 2.30–2.50 mils | 136 in.lb. | 2.6–2.8 mils | 156 in.lb. |
| 2.50–2.60 mils | 128 in.lb. | 3.3–3.5 mils | 140 in.lb. |
| 3.0–3.3 | 116 in.lb. | 4.2 mils | 136 in.lb. |
| 4.1–4.3 mils | 96 in.lb. | | |

| EXAMPLE 16 | | EXAMPLE 17 | |
|---|---|---|---|
| Film Thickness | Reverse Impact | Film Thickness | Reverse Impact |
| 1.16–1.34 mils | 160 in.lb. | 1.00–1.28 mils | 160 in.lb. |
| 1.85–1.90 mils | 160 in.lb. | 1.60–1.70 mils | 160 in.lb. |
| 2.10–2.35 mils | 124 in.lb. | 1.65–1.85 mils | 140 in.lb. |
| 2.50–2.65 mils | 108 in.lb. | 2.20–2.40 mils | 96 in.lb. |
| 2.60–2.75 mils | 116 in.lb. | 2.75–2.90 | 40 in.lb. |
| 2.90–3.10 mils | 72 in.lb. | | |

As can be seen from an inspection of the FIGURE, the coating formulations of the present invention, that is those based on polyester resins containing 1,6-hexanediol, show significantly improved reverse impact resistance (Examples 13 and 15) over those coatings based on polyester resins not containing this component (Examples 16 and 17). The improvement due to the present invention becomes increasingly apparent as the substrate is coated with thicker and thicker film coatings.

Although the present invention has been described with reference to preferred embodiments, it is to be understood that modifications and variations may be resorted to, without departing from the spirit and scope of the appended claims, as those skilled in the art will readily understand.

Having thus described our invention, we claim:

1. A thermosettable polyester resin composition derived from a polymerization reaction mixture comprising:
   (a) about 55% to about 65% by weight of a dicarboxylic aromatic acid component;
   (b) about 2% to about 7% by weight of a trihydroxy alkyl component;
   (c) about 20% to about 35% by weight of 2,2-dimethyl-1,3-propanediol or a mixture thereof with a minor amount of at least one other diol of lower molecular weight than 2,2-dimethyl-1,3-propanediol;
   (d) about 1% to about 15% by weight of an alkyl dihydroxy compound having 4 to 10 carbon atoms in the primary carbon chain between the hydroxyl moieties; and
   (e) in which mixture the aforesaid components (a) through (d), inclusive, are in a combination such that the resulting polyester has a number average molecular weight of from about 2,000 to about 6,000, a combined acid and hydroxyl number of about 35 to about 70 mg KOH per gram of polyester, and a glass transition temperature of about 35° C. to 50° C.

2. The thermosettable polyester resin composition of claim 1 in which the dicarboxylic aromatic acid component (a) is 1,4-benzenedicarboxylic acid or mixtures of 1,4-benzenedicarboxylic acid with a minor amount of 1,3-benzenedicarboxylic acid or 1,2-benzenedicarboxylic anhydride.

3. The thermosettable polyester resin composition of claim 1 in which the trihydroxy alkyl component (b) is a compound having the formula:

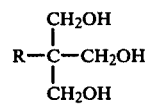

wherein R is hydrogen or alkyl.

4. The composition of claim 3 wherein the trihydroxy alkyl component is 2-ethyl-2(hydroxymethyl)-1,3-propanediol.

5. The composition of claim 3 wherein the trihydroxy alkyl component is 2-(hydroxymethyl)-2-methyl-1,3-propanediol.

6. The composition of claim 3 wherein the trihydroxy alkyl component is a mixture of 2-ethyl-2(hydroxymethyl)-1,3-propanediol and 2-(hydroxymethyl)-2-methyl-1,3-propanediol.

7. The thermosettable polyester resin composition of claim 1 wherein the dihydroxy alkyl compound (d) is 1,6-hexanediol.

8. A thermosetting powder coating composition comprising the polyester resin composition of claim 1 and further comprising a cross-linking agent, a flow control agent and a catalyst.

9. The thermosetting powder coating composition of claim 8 further comprising a pigmenting material.

10. A metal substrate coated with the powder coating composition of claim 9 and baked.

* * * * *